United States Patent
De Pauw et al.

(10) Patent No.: US 7,360,120 B2
(45) Date of Patent: Apr. 15, 2008

(54) METHODS FOR ADAPTIVE PROBLEM DETERMINATION IN DISTRIBUTED SERVICE-BASED APPLICATIONS

(75) Inventors: Wim De Pauw, Scarborough, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 10/723,343

(22) Filed: Nov. 26, 2003

(65) Prior Publication Data

US 2005/0154939 A1    Jul. 14, 2005

(51) Int. Cl.
*G06F 11/00* (2006.01)
(52) U.S. Cl. ............... 714/45; 714/38; 717/127
(58) Field of Classification Search .............. 714/45
See application file for complete search history.

(56) References Cited

U.S. PATENT DOCUMENTS

| | | | | |
|---|---|---|---|---|
| 5,130,936 | A * | 7/1992 | Sheppard et al. | 702/123 |
| 5,272,704 | A * | 12/1993 | Tong et al. | 714/26 |
| 6,012,152 | A * | 1/2000 | Douik et al. | 714/26 |
| 6,173,440 | B1 * | 1/2001 | Darty | 717/130 |
| 6,408,403 | B1 * | 6/2002 | Rodrigues et al. | 714/38 |
| 6,950,782 | B2 * | 9/2005 | Qiao et al. | 702/183 |
| 2002/0053043 | A1 * | 5/2002 | Friedman et al. | 714/25 |
| 2004/0025088 | A1 * | 2/2004 | Avvari et al. | 714/38 |
| 2004/0034456 | A1 * | 2/2004 | Felke et al. | 701/29 |
| 2004/0068677 | A1 * | 4/2004 | Briskey et al. | 714/38 |
| 2005/0081082 | A1 * | 4/2005 | Brodie et al. | 714/4 |
| 2006/0150026 | A1 * | 7/2006 | Kolawa et al. | 714/38 |

OTHER PUBLICATIONS

M. Chen et al., "Using Runtime Paths for Macroanalysis," HotOS IX—Ninth Workshop on Hot Topics in Operating Systems, Lihue, Hawaii, 6 pages, May 2000.
K.Y. Cai, "Optimal Software Testing and Adaptive Software Testing in the Context of Software Cybernetics," Information and Software Technology, 44 (14), pp. 841-855, Nov. 2002.
A. Paradkar, "Automated Generation of Self-Checking Function Tests," International Symposium on Software Reliability Engineering, 11 pages, Jul. 2002.
A. Hartman et al., "TCBeans Software Test Tool Kit," Proc. 12th Int'l Software Quality Week, 9 pages, May 1999.
C. Williams et al., "Efficient Regression Testing of Multi-Panel Systems," International Symposium on Software Reliability Engineering, 8 pages, Nov. 1999.
P.E. Ammann et al., "Using Model Checking to Generate Tests from Specifications," Proc. 2nd IEEE Conference on Formal Engineering Methods, 9 pages, Dec. 1998.

* cited by examiner

*Primary Examiner*—Scott Baderman
*Assistant Examiner*—Paul F Contino
(74) *Attorney, Agent, or Firm*—Douglas W. Cameron; Ryan, Mason & Lewis, LLP

(57) ABSTRACT

A technique for problem determination in a distributed application is provided. Testing results of the application are first obtained through execution of test cases of a test group in the application. The testing of the application is then adaptively refined when the testing results have one or more failures, to expose problems that caused the one or more failures.

3 Claims, 3 Drawing Sheets

METHODS FOR ADAPTIVE PROBLEM DETERMINATION IN DISTRIBUTED SERVICE-BASED APPLICATIONS

FIELD OF THE INVENTION

The present invention is related to distributed service-based applications and, more particularly, to adaptive problem determination in distributed service-based applications.

BACKGROUND OF THE INVENTION

Web Services are quickly becoming the common method of communication for loosely coupled distributed applications of varying languages. Web Services are self-contained, self-describing, modular applications that can be published, located, and invoked across the Internet, or across an intranet. Their programmatic interfaces can be described using Web Services Description Language (WSDL), an XML format for describing network services as a set of end points operating on messages containing either document-oriented or procedure-oriented information. The Web Services protocol is vendor and implementation independent, and therefore quickly gaining popularity as a promising approach for communication between loosely coupled distributed applications.

Many examples of Web Services used in tutorials or in technology previews typically involve only one node or service point. However, the number of nodes in Web Services configurations will grow significantly, since building tools make it very easy to compose these systems. Further, workflow systems typically interpret higher level workflow designs using a workflow engine, producing a significant amount of Web Services traffic, and increasing the complexity of the systems. As the number of nodes and the complexity of these applications grow over the coming years, it will become more challenging for developers to understand, debug, and optimize these large applications. Therefore, the major challenge for each of these complex systems will be to find where an error occurred or where the flow of messages stops in the system.

Existing debugging and problem determination techniques are largely based on "micro-analysis tools," such as code-level debuggers and simple trace logs, see, e.g., M. Chen et al., "Using Runtime Paths for Macroanalysis," HotOS IX—Ninth Workshop on Hot Topics in Operating Systems, Lihue, Hi., May 2000. While these tools are very useful for understanding behavior within a single component or thread of control, they do not provide useful information beyond these boundaries. When applications are composed of services that are distributed across a network, failures in a particular service may not manifest themselves at the service in question, from the point of view of service consumers. Additionally, failures may also occur as a result of network degradation, and the interaction of several services may be complex.

In order to overcome these and other difficulties, problem determination requires macro-level tools. These tools are capable of handling distributed component or services-based systems. They also provide the ability to correlate information from autonomous distributed components, and generally provide a view of the application from the distributed multi-threaded perspective.

Current tools such as SOAPScope, from Mindreef, Inc. of Hollis, N.H., work mostly on the wire level, "sniffing" the Web Services communication between two points. This communication is usually implemented using Simple Object Access Protocol (SOAP). This can help for logging the activity at one particular node, but debugging a complex distributed application remains difficult. SOAPTest, from Parasoft of Monrovia, Calif., has functional testing, load testing, and client testing. SOAPTest uses the classic testing strategy: after a suite of tests has been run, the user is left to determine what to do with the results. The testing phase and the inspection/debugging phases are completely separate.

Adaptive software testing has also been conducted, see, e.g., K. Y. Cai, "Optimal Software Testing and Adaptive Software Testing in the Context of Software Cybernetics," Information and Software Technology, 44 (14), November 2002, 841-855. The adaptive approach is based on the use of control theory, in which the Implementation Under Test (IUT) serves as the control, and the software testing system serves as the controller. However, Cai's approach specifies the use of controlled Markov chains for managing the adaptation strategy.

Considerable work has also been done in the area of test generation, including work on the use of fault models and planning, see, e.g., A. Paradkar, "Automated Generation of Self-Checking Function Tests," International Symposium on Software Reliability Engineering, 2002; finite-state-based techniques, see, e.g., A. Hartman et al., "TCBeans and Software Test Toolkit," Proc. 12th Intl. Software Quality Week, May 1999; techniques based on combinatorial optimization, see, e.g., C. Williams et al. "Efficient Regression Testing of Multi-Panel Systems," International Symposium on Software Reliability Engineering, 1999; and model-checking-based techniques, see, e.g., P. E. Amman et al., "Using Model Checking to Generate Tests from Specifications," Proc. 2nd IEEE Conference on Formal Engineering Methods, 1998.

SUMMARY OF THE INVENTION

The present invention provides adaptive problem determination techniques for distributed service-based applications. More particularly, the invention provides an adaptation approach which undergoes refinement as the problem determination process unfolds.

For example, in one aspect of the invention, a technique for problem determination in a distributed application comprises the following steps. Testing results of the application are first obtained through execution of test cases of a test group in the application. The testing of the application is then adaptively refined when the testing results have one or more failures, to expose problems that caused the one or more failures.

Advantageously, the inventive techniques may integrate testing and debugging, making it easier for the developer to find the cause of result failures. Further, the adaptive strategies of the technique may extend to traditional non-stochastic test generation (e.g., state-based or combinatorial testing) technologies, however stochastic techniques may also be used.

Another advantage of the inventive techniques is that they are "semi-adaptive." Typically, adaptation occurs as individual test cases are run. In the inventive technique, a suite of test cases may be produced and run, the outcomes may be analyzed, and a new suite may be developed. While both approaches offer specific advantages, the semi-adaptive approach is more suitable for testing distributed service-based systems, as a broad set of results is required in order to derive an effective adaptation strategy.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENT

Figure 1:
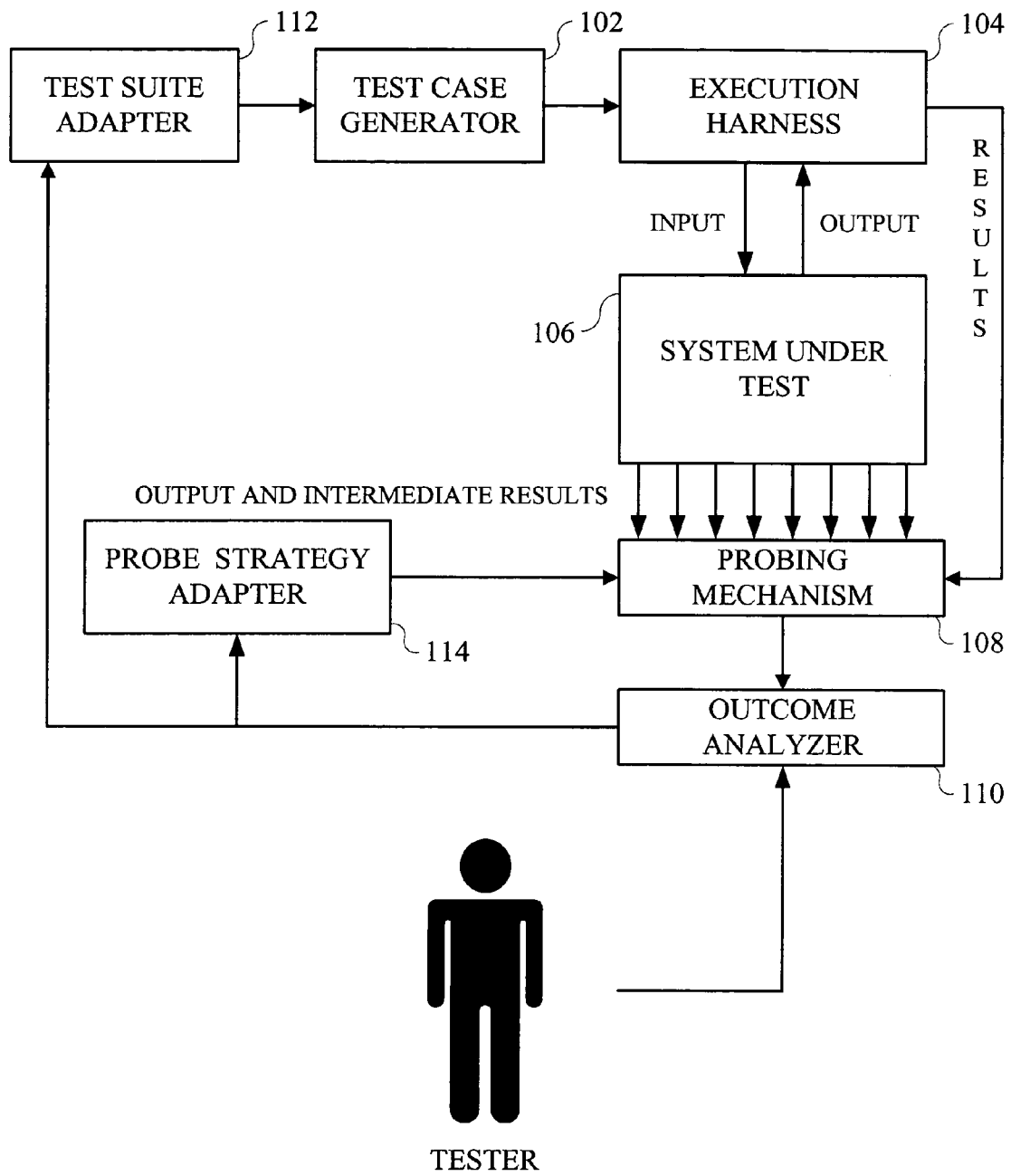
FIG. 1 is a flow diagram illustrating an adaptive problem determination system for a distributed service-based application, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform efficient and effective application testing.

The present invention relies on a two-phase adaptation approach, with both a test suite and problem determination probes undergoing refinement as the testing process unfolds. The process may begin with a generalized test suite and a probing strategy. As "hot spots," or problems, are discovered, new test suites that focus on them may be created, and the probing strategy may be refined. Thus, both the test generation method and the probing approach are flexible and easily automated. The techniques of the present invention provide novel views of both test suite and probe strategy adaptation, as well as innovative mechanisms for performing outcome analysis.

In applying the present invention to Web Services, a number of scenarios (a test suite) are first generated. The scenarios are produced automatically using a testing model, a high-level abstraction of the functional capabilities provided by the Web Services. In the first iteration, the testing model will target a wide variety of combinations and sequencing within the Web Services. Later iterations will use the model with a refined focus on the problem-prone areas to test. A set of "probes" are then installed. A probe can be implemented having, for example, Websight, a prototype tool from IBM Corp., Armonk, N.Y. Websight provides a tracing agent that can trace Web Services messages, parts of messages, values in messages, and/or the sequence of such messages. These probes can be installed semi-automatically, e.g. by remote enabling of tracing agents with appropriate parameters.

The test scenarios are then run on a configuration of nodes running the Web Services. During the run, the probes monitor the results. Typically, probes monitor high-level results (end-results) during the first iteration and more intermediate results (such as values in messages) in later iterations. These results are collected in a table, which the tester then interprets. The results will point to any existing problems in one or more given areas of the Web Services. The tester/developer may then either fix the problem by changing the code or configuration parameters, or select a refined focus for the testing model and a new probing strategy that allows more focused exploration for further problem determination. Probes in areas that return correct results may be removed. The method iterates until all discovered problems are fixed and no new problems are found.

The procedure allows for two dimensions for refinement, which are applied simultaneously. The first is refinement of the testing model, which allows test suites to be dynamically constructed to more thoroughly target areas where problems have been discovered. The second is a refinement of the probing strategy, which allows more extensive observation of the effects of testing within these targeted areas. Together, these strategies allow a developer/tester to focus on defect prone "hotspots" in the deployed Web Services.

Referring initially to FIG. 1, a flow diagram illustrates an adaptive problem determination system for a distributed service-based application, according to an embodiment of the present invention. The System Under Test (SUT) represents a configuration of Web Services, possibly distributed. The methodology is enabled by six key components. These components are: a test case generator 102, an execution harness 104, a test probe mechanism 108, an outcome analyzer 110, a test suite adapter 112, and a probe adapter 114.

For adaptive testing to be successful, test cases should be produced automatically. This is due to the fact that adaptation relies on multiple runs of an SUT 106, each of which might require a different test suite. Construction of these suites by hand is both impractical and costly. The initial input to test generator 102 is a general model of an IUT that may reside or run on the SUT. Using this model, test case generator 102 produces a suite of test cases to be executed against the IUT. Many commonly used test generation techniques are supported by the approach. Any technique where outcomes can be correlated with changes to the model is appropriate. In this embodiment, finite state and combinatorial techniques are considered, but the approach is not limited to them.

Test execution harness 104 requires multiple runs and thus multiple test suites, making manual execution prohibitive. Given a suite of test cases in a suitable representation for harness 104, harness 104 stimulates the IUT according to the steps provided in each test case. As the steps are performed, harness 104 may be provided with return data or return codes, which are sent to and used by outcome analyzer 110 to help create the adaptation strategy.

Test tools for Web Services stimulate SUT 106 with a series of inputs and then verify the output, which usually comes from one port. In complex configurations, data may be exchanged between multiple Web Services nodes. The testing strategy of the present invention allows for monitoring and tracing messages at multiple points in the configuration. In order to intercept these messages, probing mechanism 108 is used. Probes, typically implemented as plug-ins into SOAP parsers, can selectively record incoming messages at varying degrees of detail. SOAP is a preferred lightweight protocol for exchange of information in a decentralized, distributed environment using Web Services.

Recorded messages are then verified in outcome analyzer 110. Outcome analyzer 110 can be implemented as a table that is compared with a table of reference results. Depending on the IUT, this verification can be performed automatically or by a user.

Test suite adapter 112 is responsible for obtaining the analyzed outcomes from outcome analyzer 110, presenting them to the tester and making updates to the model of the IUT, either under tester control, or automatically, or some combination of both. The fundamental nature of adapter 112 is that it is able to understand both the model of the IUT and the output of outcome analyzer 110. Adapter 112 is also capable of correlating the outcome analysis with elements of the IUT model, allowing adapter 112 to make changes to the model or suggestions to the tester. This is illustrated by two simple examples.

The first example is a situation in which the test generation strategy used is based on combinatorial coverage of inputs and paths through the systems functionality, see C. Williams et al., "Efficient Regression Testing of Multi-Panel Systems," International Symposium on Software Reliability Engineering, 1999. Output analyzer 110 provides information regarding failures in particular services transactions. This information is then correlated (either by analyzer 110 or adapter 112, or both) with high level actions in the test cases. The correlated actions are explicitly represented in the model along with coverage criteria for those actions input combinations, as well as the paths that pass through them. The coverage criterion is increased automatically, or via the interaction with a tester. This leads to the construction of a new test suite, which is focused more carefully on the area where the failures were detected.

The second example is a situation in which the test generation strategy used is based on finite-state coverage techniques, see A. Hartman et al., "TCBeans and Software Test Toolkit," Proc. 12th Intl. Software Quality Week, May 1999. Once again, output analyzer 110 provides information concerning failures in particular test cases. This can be correlated with particular actions, which in turn correspond with particular states and transitions. The coverage requirements are increased for those states, their transitions, or paths through them. Also, state variables related to the troubled states are added to the model. All of these result in a model that leads to the generation of test cases, which are focused more sharply on the areas when the failures were exhibited.

In test suite adaptation, the role of the tester is vital. Thus, adapter 112 displays the current model, the outcomes of the previous run(s), and helpful information regarding the correlation of the two succinctly and clearly. Adapter 112 also makes taking actions to modify the model based on these correlations easy, preferably with a very high level of abstraction. Given these requirements, test suite adapter 112 has a significant UI or GUI component.

If an area of the configuration hints at a malfunction or failure, probe strategy adapter 114 deploys more probes in the suspected area. In addition, the newly deployed probes may record information at more detail, in order to allow for a more efficient diagnosis. Similarly, probe strategy adapter 114 may remove probes in an area of the IUT that seems to perform correctly.

Figure 2:
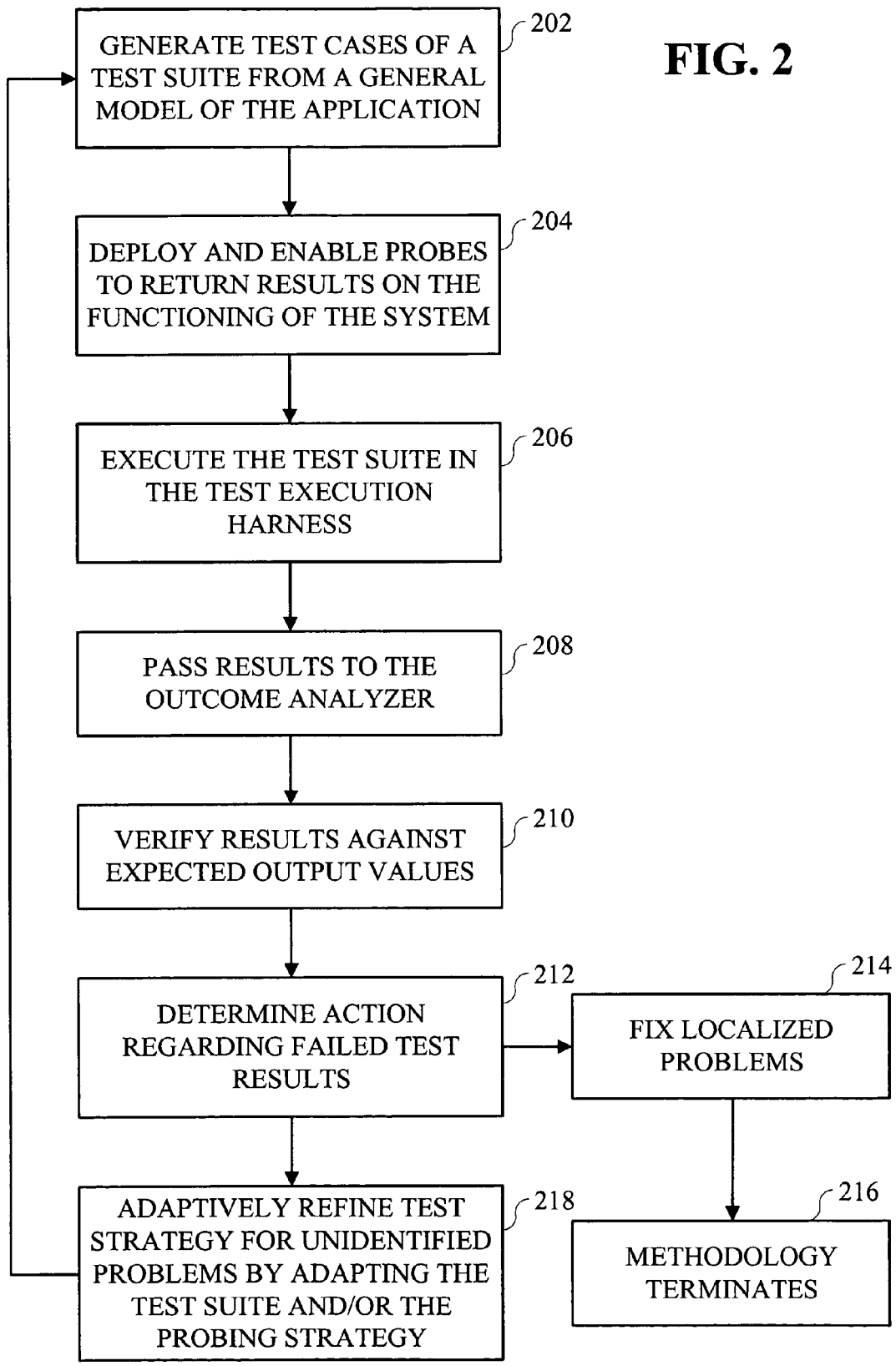
FIG. 2 is a flow diagram illustrating an adaptive problem determination methodology, according to an embodiment of the present invention.

Referring now to FIG. 2, a flow diagram illustrates an adaptive problem determination methodology, according to an embodiment of the present invention. In step 202, a test case is generated from a general model of the application being tested. The model captures all operations that can be called on all services that are externally visible from the application user's perspective. The model further captures coverage of all significant paths through the operations and coverage of key combinations of inputs to each operation that is available.

Given such a model, the generator seeks to produce a test suite that provides thorough coverage across the application with an initial set of test cases. This suite provides basic, broad coverage, and is referred to as the baseline suite. The baseline suite is provided in the format that allows it to be run automatically by the test execution harness.

In step 204, the user deploys and enables a number of probes at points that return results to test the overall functioning of the system. After the probes are in place, the test harness executes the test suite in step 206. Common test harnesses include functional harnesses that use SOAP capabilities and the WSDL definitions to stimulate the services. More complex harness for workload testing may also use information such as user profiles and statistical techniques. In a services-based environment, this is simply a sequence of stimulus/response steps, where each step involves invoking an operation (the stimulus portion) on one of the available services and then validating the resultant information (the response portion.)

The resultant information is passed to the outcome analyzer in a table of input and output in step 208. The output can be values that are returned, or the complete content of one or more SOAP messages. The user then verifies this output against expected output values, and marks each test case with "failure" or "success" in step 210.

When a problem is found, the user may determine how to proceed regarding test cases that failed in step 212. The user may decide to fix problems that have been localized in step 214, then terminate the methodology in step 216. This may be the case if the user has a strong suspicion of the cause of the problem and decide to fix the offending problem.

Alternatively, if the user is inconclusive about the cause of the problem, the user may undertake adaptive refinement for unidentified problems in step 218. When problems are discovered (i.e., there is at least one "failure" in the test results), the user may decide to refine the test strategy in one or both of the following ways:

a. Produce more test cases that expose the alleged problem and give better insight into what might be going wrong.

b. Install more probes to collect intermediary results so that the user can gain a better insight into where and why the problem occurs.

After adaptive refinement, the methodology returns to step 202, where a test suite is generated and then executed for further testing. This methodology continues in an iterative manner until all causes for failures are able to be identified and the problems are fixed in step 214.

Figure 3:
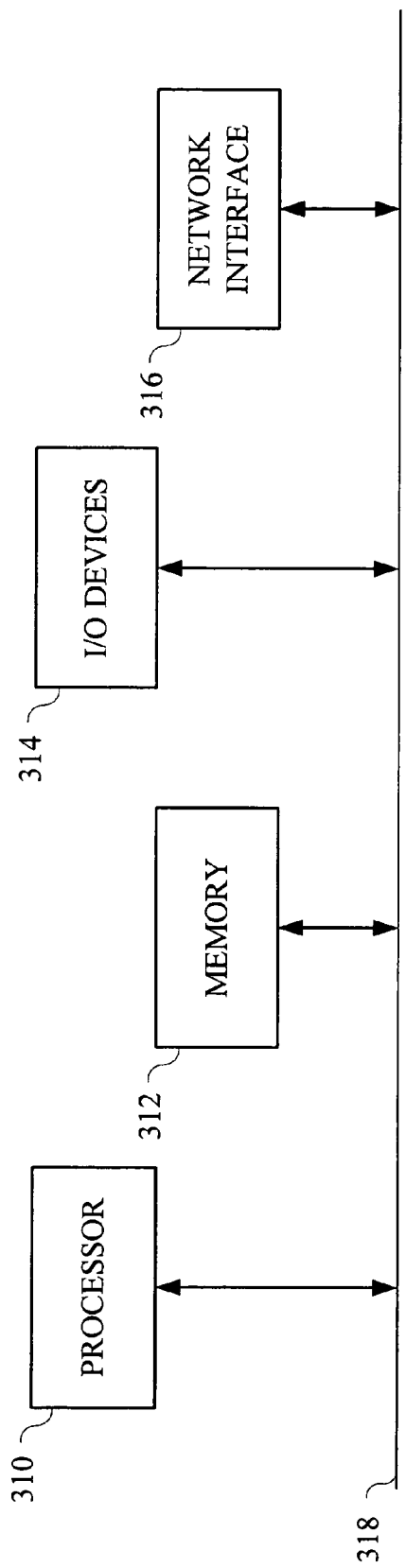
FIG. 3 is a diagram illustrating an illustrative hardware implementation of a computing system in accordance with which one or more components/methodologies of the present invention may be implemented, according to an embodiment of the present invention.

Referring now to FIG. 3, a block diagram illustrates an illustrative hardware implementation of a computing system in accordance with which one or more components/methodologies of the invention (e.g., components/methodologies described in the context of FIGS. 1 and 2) may be implemented, according to an embodiment of the present invention. For instance, such a computing system in FIG. 3 may implement test case generator 102, execution harness 104, probing mechanism 108, outcome analyzer 110, test suite adapter 112, and probe strategy adapter 114 of FIG. 1.

As shown, the computer system may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Accordingly, as described herein, the present invention provides techniques for adaptively refining service oriented applications. More particularly, the present invention provides an adaptation approach which undergoes refinement as the testing process unfolds.

Although illustrative embodiment of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of problem determination in a distributed service-based application, comprising the steps of:
    obtaining, via one or more probes, at least one testing result of the application through execution of at least one test group, wherein the test group comprises one or more test cases; and
    adaptively refining the at least one executed test group when the at least one testing result comprises at least one failure, to expose at least one problem that caused the at least one failure,
    wherein the step of adaptively refining the at least one executed test group comprises at least one of generating one or more new test cases and refining the one or more probes, and
    wherein the step of obtaining testing results comprises the steps of generating a test group having at least one test case, from a general model of the application; executing the at least one test case of the test group in the application; passing the at least one result of the test group to an outcome analyzer; and verifying the at least one result against expected output at the outcome analyzer, wherein the step of verifying the at least one result comprises the step of marking each test case of the test group with a failure or a success.

2. A method of problem determination in a distributed service-based application, comprising the steps of:
    obtaining, via one or more probes, at least one testing result of the application through execution of at least one test group, wherein the test group comprises one or more test cases; and
    adaptively refining the at least one executed test group when the at least one testing result comprises at least one failure, to expose at least one problem that caused the at least one failure,
    wherein the step of adaptively refining the at least one executed test group comprises at least one of generating one or more new test cases and refining the one or more probes, and
    wherein the step of adaptively refining the at least one executed test group comprises the steps of disabling one or more probes that returned one or more results that did not relate to the at least one problem and repeating the method of problem determination in a distributed service-based application.

3. A method of problem determination in a distributed service-based application, comprising the steps of:
    obtaining, via one or more probes, at least one testing result of the application through execution of at least one test group, wherein the test group comprises one or more test cases; and
    adaptively refining the at least one executed test group when the at least one testing result comprises at least one failure, to expose at least one problem that caused the at least one failure,
    wherein The step of adaptively refining the at least one executed test group comprises at least one of generating one or more new test cases and refining the one or more probes, and
    wherein the step of adaptively refining the at least one executed test group comprises the steps of enabling one or more additional probes that return one or more results relating to the at least one problem, disabling one or more probes that returned one or more results that did not relate to the at least one problem, adapting the test group to comprise at least one test case focused on the at least one problem, and repeating the method of problem determination in a distributed service-based application.

* * * * *